(No Model.)
H. C. SWAN.
ADJUSTABLE STEP PAD.
No. 598,398. Patented Feb. 1, 1898.
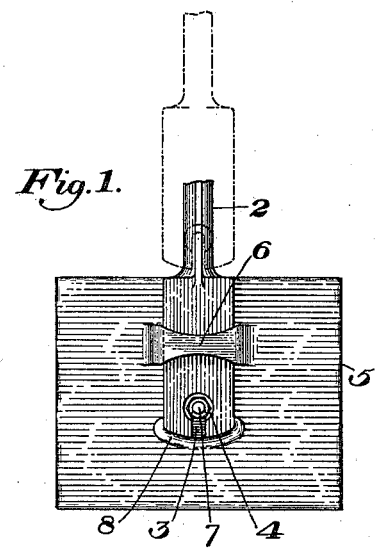
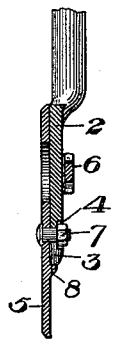
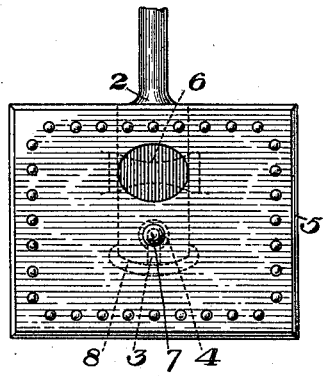
WITNESSES
INVENTOR
Henry. C. Swan

UNITED STATES PATENT OFFICE.

HENRY C. SWAN, OF OSHKOSH, WISCONSIN.

ADJUSTABLE STEP-PAD.

SPECIFICATION forming part of Letters Patent No. 598,398, dated February 1, 1898.

Application filed September 4, 1897. Serial No. 650,571. (No model.)

*To all whom it may concern:*

Be it known that I, HENRY C. SWAN, of Oshkosh, in the county of Winnebago and State of Wisconsin, have invented a new and useful Improvement in Adjustable Step-Pads, of which the following is a full, clear, and exact description, reference being had to the accompanying drawings, forming a part of this specification, in which—

Figure 1 is a bottom plan view of the pad secured in place. Fig. 2 is a top plan view of the same, and Fig. 3 is a cross-sectional view showing the means for attachment.

My invention relates to step-pads, and is designed to provide improved means whereby step-pads of different sizes and designs may be secured to the same shank.

In the drawings, 2 represents the step-shank, having at its forward end a slot 3, which leads to a circular recess 4.

5 is the pad, which is preferably provided on its under side with a loop 6, struck up from the body and in front of the same, with a bolt-hole, through which extends a bolt 7.

The pad which I show in the drawings is intended to be used with a rubber face which covers the head of the bolt, and on this account I employ the slot in the end of the shank, since in these rubber pads the bolt must remain in position in the pad. In adjusting the parts the shank is slipped through the loop in the pad and pushed forward so as to cause the bolt to enter that portion of the slot which is surrounded by the recess 4. The nut then being screwed down sets in this recess, thus preventing the withdrawal of the shank and securing the pad firmly in place. The nut may be provided with a round base portion which will fit in the recess 4, or, if desired, a loose washer may be employed under the nut, this washer fitting the recess. The pad is preferably provided with a shoulder 8, which acts as a stop for the end of the shank.

The advantages of my invention will be apparent to those skilled in the art, since a simple, neat, and effective fastening is provided, by means of which pads of different sizes and shapes may be used interchangeably upon the same shank.

In place of using the loop, as shown in the drawings, I may employ two side lugs, which engage the edges of the shank at this point and form a guide, this being the main function of the loop, and many other changes may be made in the form and arrangement of the parts without departing from my invention, since

What I claim is—

1. The combination with a step-shank having a slotted end and a recess surrounding the inner end of the slot, of a step-pad having a bolt arranged to enter the slot, the nut of the bolt being arranged to lie in the recess of the shank.

2. The combination with a step-shank having a slotted end, of a recess surrounding the inner end of the slot on the under side of the shank, a pad having a bolt entering the slot in the shank, the nut of the bolt engaging the recess of the shank, and an intermediate guide for the shank located on the under side of the pad.

3. The combination with a step-shank having a slotted end and a recess surrounding the inner end of the slot, of a pad having a loop through which the shank passes, and a bolt passing through the pad and engaging the slot, the nut of the bolt lying within the recess of the shank.

In testimony whereof I have hereunto set my hand.

HENRY C. SWAN.

Witnesses:
 THOMAS R. BECKWITH,
 DANZIE W. GARRINGTON.